United States Patent
Cometto et al.

(10) Patent No.: US 7,206,288 B2
(45) Date of Patent: Apr. 17, 2007

(54) METHODS AND APPARATUS FOR CHARACTERIZING A ROUTE IN FIBRE CHANNEL FABRIC

(75) Inventors: Maurilio Cometto, San Jose, CA (US); Thomas James Edsall, Cupertino, CA (US)

(73) Assignee: Cisco Technology, Inc., San Jose, CA (US)

(*) Notice: Subject to any disclaimer, the term of this patent is extended or adjusted under 35 U.S.C. 154(b) by 1012 days.

(21) Appl. No.: 10/170,855

(22) Filed: Jun. 12, 2002

(65) Prior Publication Data

US 2005/0169188 A1 Aug. 4, 2005

(51) Int. Cl.
*H04L 12/26* (2006.01)

(52) U.S. Cl. .................... 370/249; 370/252

(58) Field of Classification Search ............ None
See application file for complete search history.

(56) References Cited

U.S. PATENT DOCUMENTS

| | | | |
|---|---|---|---|
| 5,506,838 A | 4/1996 | Flanagan | 370/54 |
| 5,617,421 A | 4/1997 | Chin et al. | |
| 5,675,741 A | 10/1997 | Aggarwal et al. | 395/200.12 |
| 5,682,479 A | 10/1997 | Newhall et al. | 395/200.15 |
| 5,740,159 A * | 4/1998 | Ahmad et al. | 370/249 |
| 5,740,171 A | 4/1998 | Mazzola et al. | |
| 5,742,604 A | 4/1998 | Edsall et al. | |
| 5,764,636 A | 6/1998 | Edsall | |
| 5,809,285 A | 9/1998 | Hilland | |
| 5,999,930 A | 12/1999 | Wolff | |
| 6,035,105 A | 3/2000 | McCloghrie et al. | |
| 6,101,497 A | 8/2000 | Ofek | |
| 6,188,694 B1 | 2/2001 | Fine et al. | |
| 6,202,135 B1 | 3/2001 | Kedem et al. | |
| 6,208,649 B1 | 3/2001 | Kloth | |
| 6,209,059 B1 | 3/2001 | Ofer et al. | |
| 6,219,699 B1 | 4/2001 | McCloghrie et al. | |
| 6,226,771 B1 | 5/2001 | Hilla et al. | |
| 6,260,120 B1 | 7/2001 | Blumenau et al. | |
| 6,266,705 B1 | 7/2001 | Ullum et al. | |
| 6,269,381 B1 | 7/2001 | St. Pierre et al. | |
| 6,269,431 B1 | 7/2001 | Dunham | |
| 6,295,575 B1 | 9/2001 | Blumenau et al. | |
| 2002/0009081 A1 | 1/2002 | Sampath et al. | 370/389 |
| 2005/0117562 A1* | 6/2005 | Wrenn | 370/351 |

FOREIGN PATENT DOCUMENTS

| | | |
|---|---|---|
| WO | 00/31925 | 6/2000 |
| WO | 01/95565 | 12/2001 |

OTHER PUBLICATIONS

K. White, "RFC 2925: Definition of Managed Objections for Remote Ping, Traceroute, and Lookup Operations", 2000, pp. 1-4.*
D. Mills, Network Working Group Request for Comments 1059, *Network Time Protocol (Version 1) Specification and Implementation*, University of Delaware, Jul. 1988, p. 1-50.
Edsall et al., *Methods And Apparatus For Encapsulating A Frame For Transmission In A Storage Area Network*, Filed Dec. 26, 2001, U.S. Appl. No. 10/034,160.
International Search Report mailed Nov. 4, 2003; PCT/US03/18765. 3 sheets.

* cited by examiner

*Primary Examiner*—Steven Nguyen
(74) *Attorney, Agent, or Firm*—Beyer Weaver LLP

(57) ABSTRACT

Methods and apparatus are provided for determining characteristics associated with routes in fibre channel networks. Techniques are provided for inserting time stamp information into frames transmitted from a source to a destination and back to the source. Time stamp information allows a supervisor associated with a source to determine characteristics such as round trip times, latency between hops, and connectivity to a destination for specific routes.

31 Claims, 8 Drawing Sheets

METHODS AND APPARATUS FOR CHARACTERIZING A ROUTE IN FIBRE CHANNEL FABRIC

CROSS-REFERENCE TO RELATED APPLICATIONS

The present application is related to U.S. patent application Ser. No. 10/034,160 by Tom Edsall, Dinesh Dutt, and Silvano Gai and titled Extended ISL Header as of filing on Dec. 26, 2001, the entirety of which is incorporated by reference for all purposes.

BACKGROUND OF THE INVENTION

1. Field of the Invention

The present invention relates to fibre channel networks. More specifically, the present invention relates to methods and apparatus for determining characteristics associated with particular routes in fibre channel networks.

2. Description of Related Art

Methods and apparatus for determining route characteristics in fibre channel network are limited. Many fibre channel networks lack efficient mechanisms for performing functions such as determining connectivity to a destination, understanding the path followed by a specific data flow, evaluating the latency of each hop, tracing a route, etc.

It is therefore desirable to provide additional methods and apparatus for improving the determination of route characteristics in fibre channel networks with respect to some or all of the performance limitations noted above.

SUMMARY OF THE INVENTION

Methods and apparatus are provided for determining characteristics associated with routes in fibre channel networks. Techniques are provided for inserting time stamp information into frames transmitted from a source to a destination and back to the source. Time stamp information allows a supervisor associated with a source to determine characteristics such as round trip times, latency between hops, and connectivity to a destination for specific routes.

In one embodiment, a method for providing route characteristic information in a fibre channel fabric is provided. A fibre channel frame is provided at a source fibre channel switch. The fibre channel frame identifies the source fibre channel switch and a destination. The fibre channel frame includes a loopback field indicating that the fibre channel frame should be looped back to the source fibre channel switch. The fibre channel frame is transmitted downstream toward the destination. The looped back fibre channel frame is received at the source fibre channel switch. The loopback fibre channel frame including time stamp information associated with a plurality of fibre channel switches between the source fibre channel switch and the destination. The time stamp information provides information for determining characteristics associated with upstream and downstream transmission between the source fibre channel switch and the destination.

In another embodiments, a method for providing route characteristic information in a fibre channel fabric is provided. A fibre channel frame is received at a core fibre channel switch. The the fibre channel frame includes a loopback field, a source identifier, and time stamp information. The time stamp information is associated with a plurality of fibre channel switches the fibre channel frame passed through between the source and the core fibre channel switch. It is determined whether to forward the fibre channel frame or to loop back the fibre channel frame.

In still another embodiment, a fibre channel switch in a fibre channel fabric is provided. The fibre channel switch includes a processor, an input interface, and an output interface. The processor is operable to provide a fibre channel frame, the fibre channel frame identifying the source fibre channel switch and a destination. The fibre channel frame includes a loopback field indicating that the fibre channel frame should be looped back to the source fibre channel switch. The output interface is coupled to the processor. The output interface is configured to transmit the fibre channel frame downstream toward the destination. The input interface is coupled to the processor. The input interface is configured to receive the looped back fibre channel frame at the source fibre channel switch. The loopback fibre channel frame includes time stamp information associated with a plurality of fibre channel switches between the source fibre channel switch and the destination. The time stamp information provides information for determining characteristics associated with upstream and downstream transmission between the source fibre channel switch and the destination.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

Figure 1:
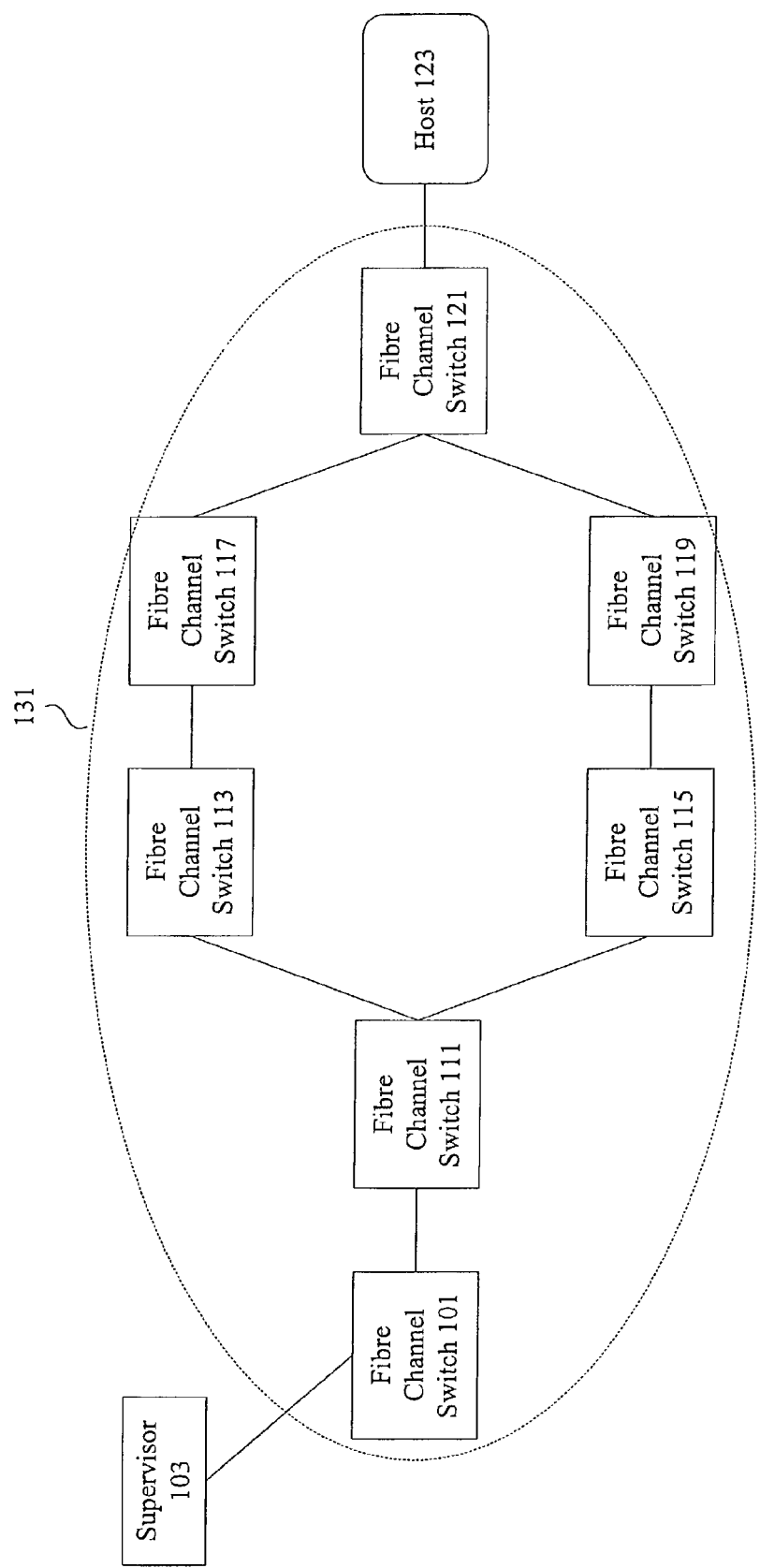
FIG. 1 is a diagrammatic representation of a network that can use the techniques of the present invention.

FIG. 1 is a diagrammatic representation of a fibre channel network that can use the techniques of the present invention. According to various embodiments, a supervisor 103 associated with a fibre channel switch 101 may wish to determine characteristics of a route from a source fibre channel switch 101, to a fibre channel switch 121 associated with a host 123, and back to the source fibre channel switch 101. A network node that sends a frame for characterizing a route back to a source upon receiving the frame from the source is referred to herein as a loopback fibre channel switch. Any logic, apparatus, or mechanism associated with a source fibre channel switch for generating messages or frames to characterize one or more routes is referred to herein as a supervisor.

It should be noted that a supervisor may be an entity distinct from a source fibre channel switch. However, it is also contemplated that the supervisor can be integrated as part of a source fibre channel switch. A host 123 associated with a loopback fibre channel switch can be a variety of entities such as disk, a server, a client, an array of disks, etc. In order to determine characteristics of a route between source fibre channel switch 101 and loopback fibre channel switch 121, implementations using mechanisms such as ping and trace route are contemplated. Using ping, one or more packets are transmitted from a source fibre channel switch 101 to a loopback fibre channel switch 121 associated with a host 123.

In one embodiment, a frame sent from source fibre channel switch 101 toward a host 123 travels through fibre channel switches 111, 113, 117, and 121. A frame returns to source fibre channel switch 101 through fibre channel switches 121, 119, 115, and 111. Mechanisms such as ping provide information on whether a host 123 associated with fibre channel switch 121 is reachable. Ping also provides information on round-trip times and average round-trip times for transmission between the source and the destination. However, mechanisms such as ping provide little information on what route was chosen, the period of time taken between hops, etc.

Other mechanisms such as trace route allow a source fibre channel switch to incrementally transmit a frame to an increasing number of hops. For example, in a first round, a frame is transmitted only for a single hop. In this example, a frame is transmitted from fibre channel switch 101 to a fibre channel switch 111. The round-trip times would be measured. In the second round, the frame would be transmitted a total of two hops from fibre channel switch 101 to fibre channel switch 111 and finally to fibre channel switch 113. The round-trip time would again be measured. Mechanisms such as trace route allow the determination of round-trip times between a source and intermediate nodes to a destination. Nodes in a route between a source and a destination are referred to herein as intermediate nodes. Trace route provides more information than mechanisms such as ping.

Trace route provides information on whether a destination node is reachable and also provides information on round-trip times between a source fibre channel switch and intermediate hops. However, trace route still does not provide information detailing the break-up of the round-trip time. For example, trace route does not detail the return path characteristics. The methods and apparatus of the present invention provide techniques for efficiently implementing techniques such as ping and trace route in a fibre channel network using mechanisms that provide even more information about the characteristics of a route.

In one example, the techniques of the present invention provide information on how much time it takes for a frame to travel from a switch 101, through a switch 111, to a switch 113, and back through a switch 111, and finally to a switch 101. According to various embodiments, the latency for each hop in a route between a source and the destination is measured for both upstream and downstream transmission. Transmission from a source to a destination is referred to herein as downstream transmission while transmission from a destination to a source is referred to herein as upstream transmission. Mechanisms and logic for determining timing characteristics associated with a route are referred to herein as remote domain loopback (RDL). A frame transmitted from a source to a destination and back to a source used to implement RDL is referred to herein as a loopback frame. A transmission information entry in a frame that indicates that the frame is being used as a loopback frame is referred to herein as a loopback field or a loopback indicator.

Frames transmitted for determining route characteristics are referred to herein as RDL frames. According to various embodiments, a path followed for a specific data flow in a fibre channel fabric can be characterized and a route followed by data traffic can be understood. A determination of connectivity in the fabric toward a specific destination node can also be determined.

According to various embodiments, fibre channel switches in the fibre channel fabric 131 can be synchronized. A variety of global synchronization protocols can be used. In one example, the Network Time Protocol (NTP) is run on the fibre channel fabric. NTP is described in RFC 1059 titled Network Time Protocol, the entirety of which is incorporated by reference for all purposes. If a supervisor 103 associated with a fibre channel switch 101 wishes to determine characteristics of a route to and from a fibre channel switch 121 associated with a host 123, RDL frames can be transmitted toward the loopback fibre channel switch 121 associated with host 123. At each hop, time stamp information is added to the frame to allow characterization of the route.

In one example, a frame may be transmitted from fibre channel switch 101 at time 00.00 seconds exactly. It may take 0.01 seconds to reach fibre channel switch 111, at which time fibre channel switch 111 adds time stamp information including 00.01 seconds. Each intermediate hop in the route toward the destination also inserts time stamp information into the frame. Information for characterizing latency between hops in a route between a source and a loopback fibre channel switch is referred to herein as time stamp information. According to various embodiments, time stamp information includes a port number, a switch identifier, and a time stamp. When the RDL frame reaches a loopback fibre channel switch 121, the fibre channel switch 121 does not forward the RDL frame to host 123 and instead sends it back towards the source fibre channel switch 101.

According to various embodiments, fibre channel switch 121 recognizes that a host 123 is the end node. In another example, fibre channel switch 121 may send a frame back towards the source fibre channel switch 101 if the fibre channel switch 121 recognizes that the next hop toward a destination is an entity that does not support RDL frames. A network entity that is not operable to add time stamp information to a loopback frame does not support RDL according to various embodiments. A fibre channel switch 121 may loop back the frame along an upstream route that is different from the downstream route. Time stamp information at each hop along an upstream route is added to the RDL frame. When a fibre channel switch 101 receives the frame looped back from the loopback fibre channel switch, a fibre channel switch 101 provides time stamp information to a supervisor 103 to allow characterization of the route.

According to other embodiments, fibre channel switches in the fibre channel fabric 131 are not synchronized. Nonetheless, valuable information can be acquired from time stamp information provided at each hop. In one example, the total round-trip time for asymmetric route could be obtained. Furthermore, changes in latency for a particular hop could be determined even if the different switches in a fibre channel fabric had widely different times.

Figure 2:
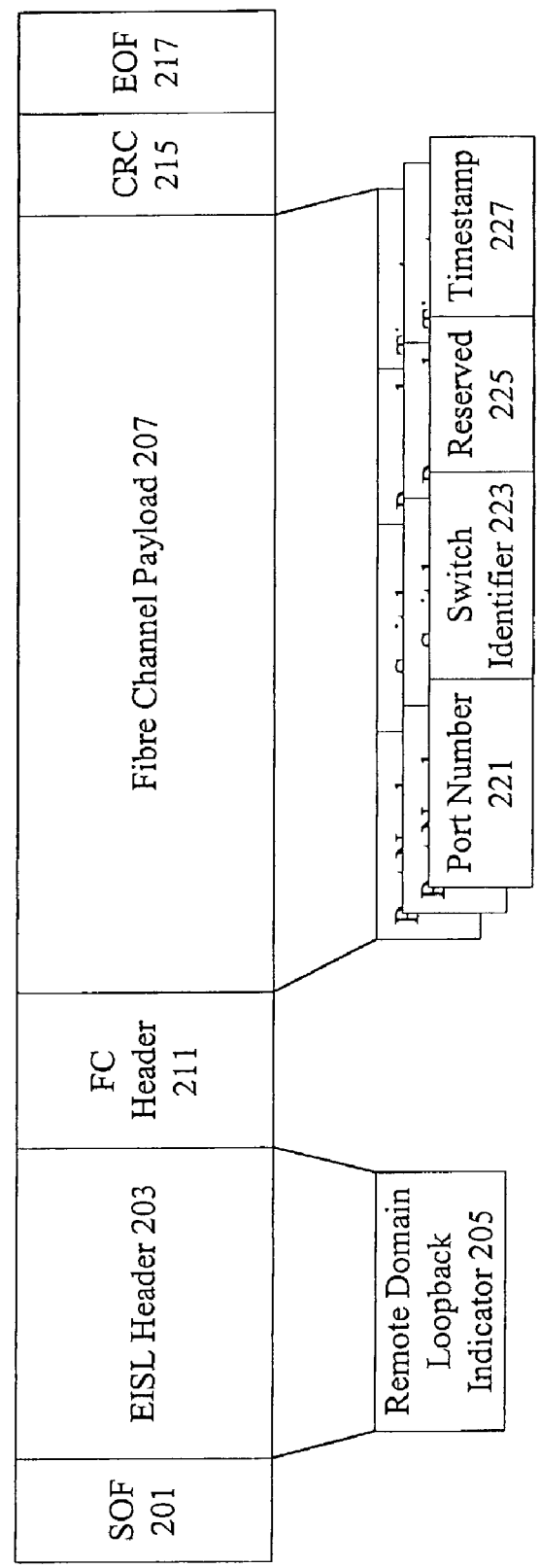
FIG. 2 is a diagrammatic representation of a loopback frame.

FIG. 2 is a diagrammatic representation of a frame that can be used to implement RDL. According to various embodiments, a loopback indicator 205 is located in the Extended Inter-switch Links (EISL) header 203. In one example, the loopback indicator is a vendor unique code indicating that the frame is a loopback frame. EISL is described in application Ser. No. 10/034,160 titled Methods And Apparatus For Encapsulating A Frame For Transmission In A Storage Area Network by Thomas J. Edsall, Dinesh G. Dutt, and Silvano Gai. It should be noted that an RDL indicator can also be located in other fields such as in FC Header 211.

According to various embodiments, the payload 207 of the fibre channel frame contains time stamp information inserted at each hop. In one example, time stamp information is inserted at the beginning of the payload by shifting the existing time stamp information by a predetermined number of bytes. The time stamp information for characterizing a route can include entries such as the port number 221 associated with the input port of a switch inserting the time stamp information, a field identifying the switch 223 such as a world wide name (WWN), a time stamp 227, and a reserved field for any additional information such as error codes that a switch wishes to insert.

According to specific embodiments, the fibre channel payload 207 includes a stack of 8-byte time stamp information entries. The time stamp information entries are used by a supervisor associated with a fibre channel switch for determining route characteristics such as the latencies between switches in a route.

It should be noted that the EISL header can include other fields such as a time-to-live (TTL) field. The time-to-live field is decremented at each hop like the time-to-live field in a conventional IP packet.

Figure 3:
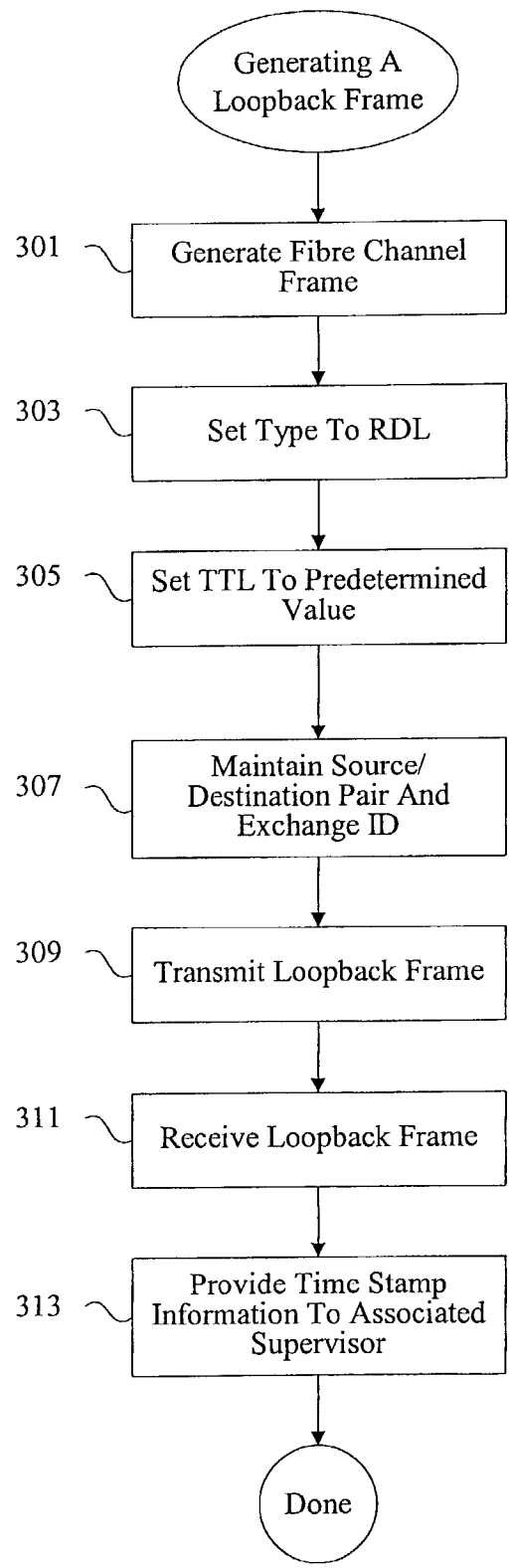
FIG. 3 is a flow process diagram showing operations at a source fibre channel switch.

FIG. 3 is a process flow diagram showing one example of generating a loopback frame at a source fibre channel switch associated with a supervisor. According to various embodiments, a fibre channel frame is generated at 301. In one embodiment, the fibre channel frames generated is a conventional fibre channel frame valid for transmission in the fibre channel fabric. At 303, a loopback field such as an RDL indicator in the fibre channel frame is set. Setting the loopback field can entail setting an RDL indicator into an EISL header associated with the fibre channel frame. At 305, the TTL field is set to a predetermined value. In one embodiment, the TTL can be set to the same values used for setting other fibre channel frames that do not include a loopback indicator. In one example, the TTL field a set to the value of 64.

Setting the TTL field to a high-value increases the likelihood that the fibre channel frame will reach its destination. However, setting too high a value may cause a frame that should be dropped to remain too long in a fibre channel fabric. At 307, the destination switch identifier is maintained. In one embodiment, the exchange identifier is also maintained at the source fibre channel switch to allow the source fibre channel switch to determine whether a loopback frame transmitted toward a destination has been successfully looped back from the destination. At 309, the loopback frame is transmitted toward the destination. At 311, the loopback frame initially transmitted toward the destination is received after it is successfully looped back from the destination. According to various embodiments, the loopback frame received is different from the loopback frame transmitted.

In one embodiment, the source and destination address fields in the loopback frame transmitted by a source are swapped when the loopback frame is received by the source. Other fields and indicators such as originator and destination bits may also be changed. At 311, the source fibre channel switch then extracts the time stamp information inserted at the various hops in the route from the source fibre channel switch, to the loopback fibre channel switch, and back to the source fibre channel switch. The time stamp information is provided to an associated supervisor at 313.

Figure 4:
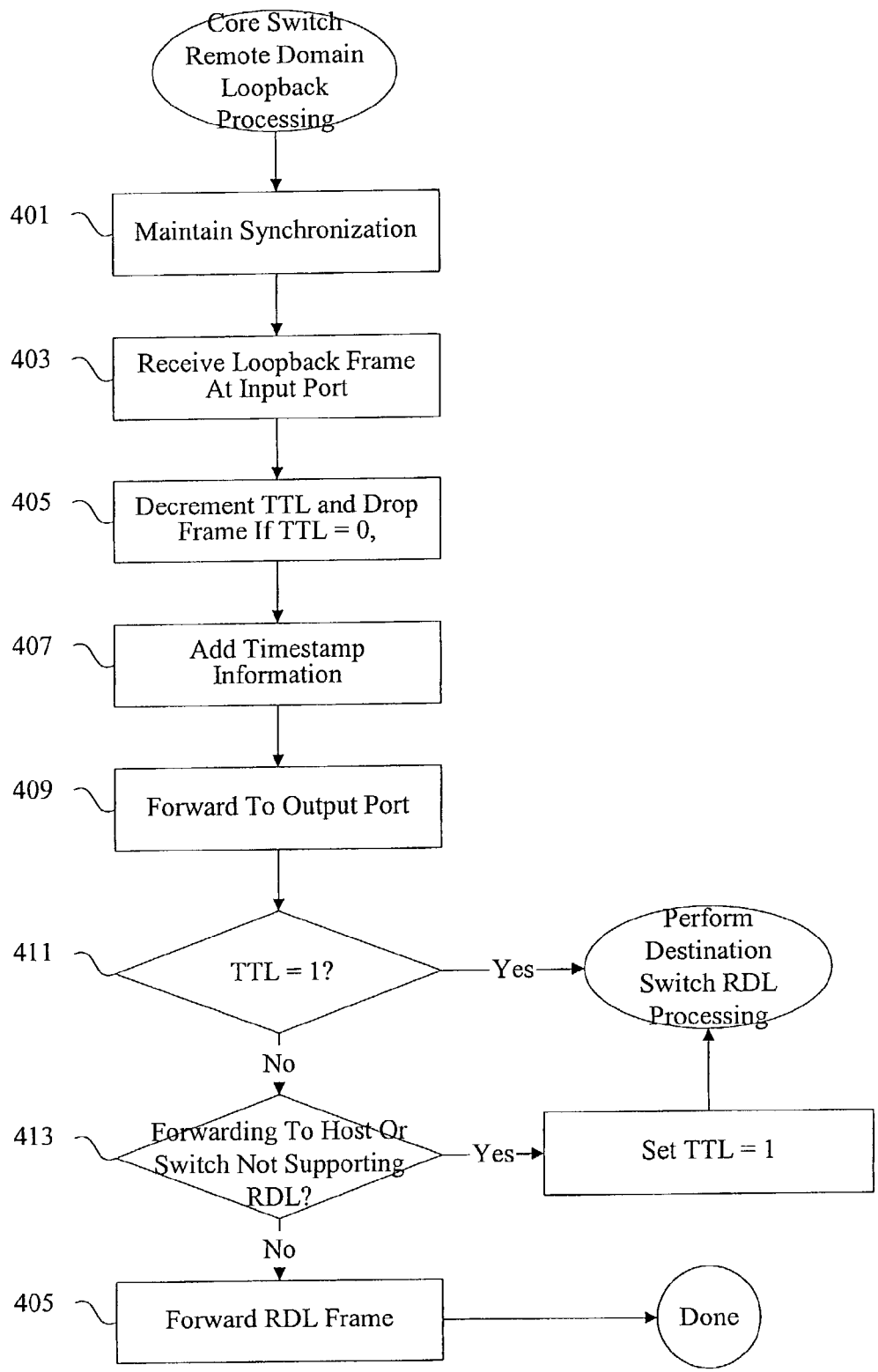
FIG. 4 is a flow process diagram showing operations at a core fibre channel switch.

FIG. 4 is a process flow diagram showing one example of core fibre channel switch RDL processing. Any fibre channel switch that a source fibre channel switch transmits to is referred to herein as a core fibre channel switch. According to various embodiments a core fibre channel switch can be an intermediate switch between a source and a destination. It should also be noted that a core fibre channel switch may determine that it is the loopback fibre channel switch upon examining a loopback frame.

At 401, synchronization is maintained with other fibre channel switches in the fibre channel fabric. In typical implementations, synchronization is maintained outside of the steps of FIG. 4. Synchronization can be maintained using protocols such as NTP where switches in the fibre channel fabric acquire a uniform time from one or more particular fibre channel switches. At 403, the loopback frame is received at an input port. It should be noted that a fibre channel switch can have one or more input ports. In one embodiment, the port number associated with the input port is maintained. At the input port, conventional fibre channel frame processing can also be performed. Conventional fiber channel frame processing can include dropping the frame if a time-to-live field is equal to 0 at 405. Otherwise, the time-to-live field is decremented.

At 407, time stamp information is added to the frame. Adding time stamp information can entail shifting bytes in the frame, changing header information, as well as adding information such as an input port number, the current time, and a field uniquely identifying the switch. It is contemplated that in some embodiments, certain frames along the route may not insert time stamp information. Nonetheless the techniques of the present invention provide mechanisms for determining characteristics for transmission between many hops in a route between a source and the destination. According to various embodiments, the process steps at a core fibre channel switch can be performed by a media access control (MAC) block used for forwarding fibre channel frames. An output port is then selected using mechanisms such as a forwarding table. The loopback frame is forwarded to the selected output port at 409. At 411, it is determined if the time-to-live field is equal to one.

If the time-to-live field is equal to one, the core fibre channel switch becomes a loopback fibre channel switch for loopback processing. Fibre channel switch loopback processing will be described in FIG. 5. If the TTL is not equal to one, it is determined if the frame is being forwarded to either a switch that does not support RDL or to a host. According to various embodiments, hosts such as disks and disk arrays and switches that do not support RDL are not able to handle loopback frames. A switch about to forward a loopback frame to a host or a switch that does not support RDL instead sets the TTL to one at 417 and performs loopback switch RDL processing. Otherwise the frame is forwarded at 415.

Figure 5:
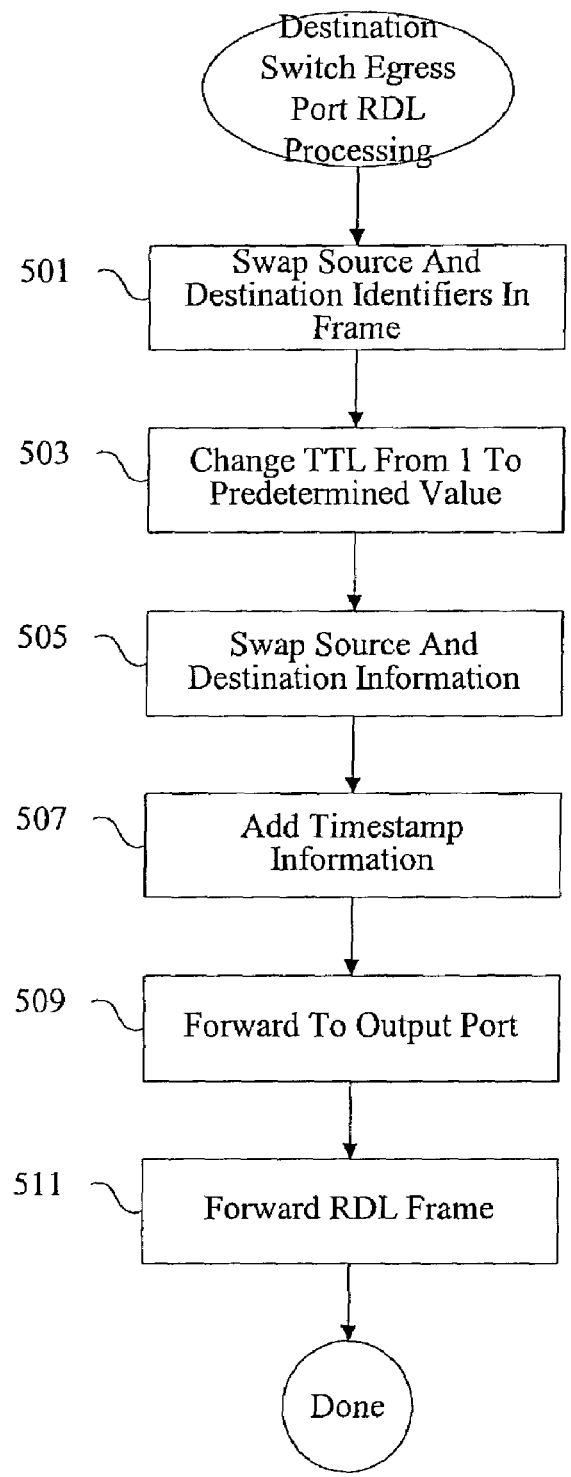
FIG. 5 is a flow process diagram showing operations at a core fibre channel switch determined to be a loopback fibre channel switch.

FIG. 5 is a process flow diagram showing loopback switch output port RDL processing. As noted above, a core fibre channel switch becomes a loopback fibre channel switch when the TTL is determined to be equal to one at the output port or the frame is about to be forwarded to a host or a switch that does not support RDL. According to various embodiments, the loopback switch is where the RDL frame is looped back to the source fibre channel switch. It should be noted that a loopback switch may also be a destination switch in some examples, as the switch may be associated with a host corresponding to the destination of the fibre channel frame.

At 501, source and destination identifiers in the frame are swapped at the output port of the loopback fibre channel switch. At 503, the TTL is changed from one to a predetermined value large enough to allow the frame to reach the source fibre channel switch from the loopback fibre channel switch. At 505, other source and destination information is swapped. In one example, originator and destination bits are set accordingly at the output port of the loopback fibre channel switch. According to various embodiments, the output port number becomes an input port performing functions similar to that of a core fibre channel switch input port. At 507, time stamp information is added to the RDL frame. At 509, the frame is forwarded to an output port for transmitting the frame towards a source. The RDL frame is forwarded at 511.

Figure 6:
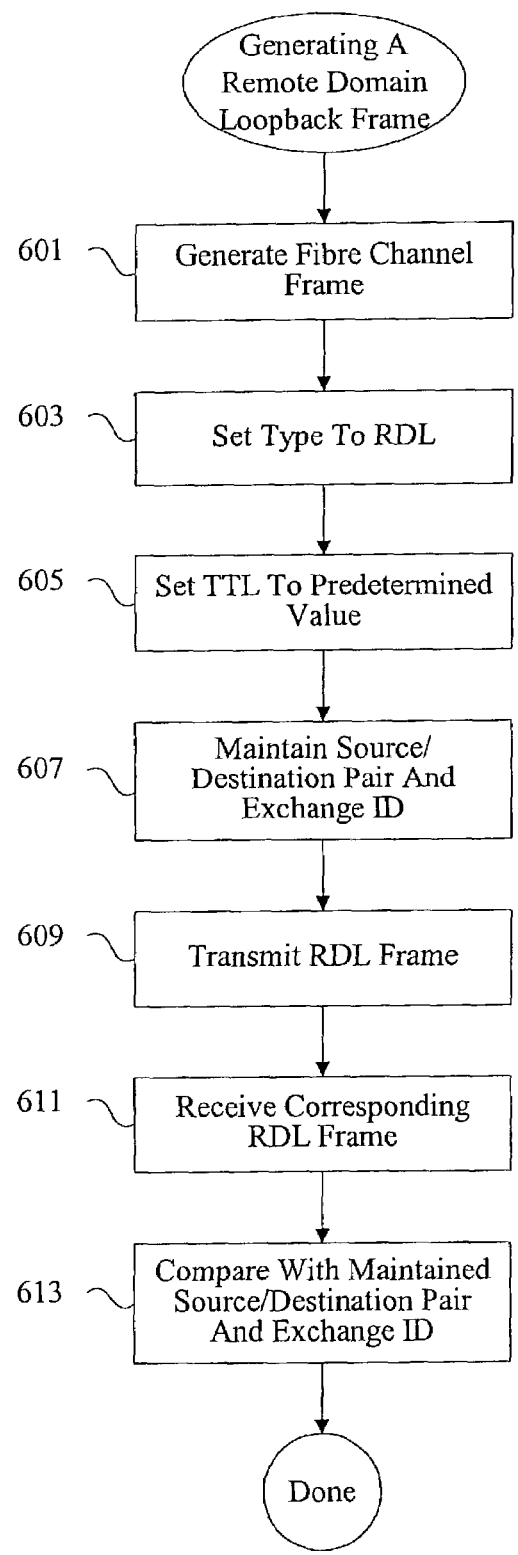
FIG. 6 is a flow process diagram showing operations for applying remote domain loopback for determining connectivity.

FIG. 6 is a process flow diagram showing one example of the RDL frame generation for determining connectivity to a destination. A supervisor may wish to determine whether a destination is reachable from a source fibre channel switch. At 601, a fibre channel frame is generated. According to various embodiments, the frame generated is a valid fibre channel frame. At 603, a loopback indicator is set. At 605, a time-to-live field is set to a predetermined value to allow the frame to travel to a loopback fibre channel switch. The TTL value may be based on the size of the fibre channel fabric as well as the maximum length of a frame. At 607, identifiers associated with the source and destination pair and the exchange identifier are maintained.

It should be noted that the process steps described in the various process flow diagrams do not necessarily have to be performed in any particular order. For example, source and destination pair and exchange identifiers can be maintained before a loopback indicator is set or a time-to-live field is set. Variations are also possible. In one example, an exchange identifier and a source identifier are not maintained. A destination identifier is maintained and some other sequence number is maintained instead.

According to various embodiments, the source, destination, and exchange identifiers are maintained. At 609, the loopback frame is transmitted toward the destination. The frame is then processed by various core fibre channel switches and sent back toward the source when the frame reaches a loopback fibre channel switch. At 611, the looped back frame is received by the source fibre channel switch. In one embodiment, the loopback frame contains time stamp information associated with each of the hops the frame traversed in its route to and from the loopback fibre channel switch. Header information in the looped back frame is compared with source and destination identifier and exchange identifier information maintained at 607. If the information corresponds, time stamp information is analyzed to determine if there is connectivity to the loopback fibre channel switch at 613.

If time stamp information is available in the frame, the time stamp information can be checked to determine what routes the frame traversed during downstream as well as upstream transmission. As noted above, fields indicating what fibre channel switches the frame has traversed are included in time stamp information in the loopback frame. If no looped back RDL frame corresponding to the maintained source, destination, and exchange identifier information is received, it can be inferred that there may be no connectivity to the destination. Similarly, if time stamp information indicates that the frame was looped back before reaching a destination, it can be determined that no connectivity exists. In one embodiment, a TTL value can be increased and another attempt can be made to reach the destination where a TTL field may have expired before the frame had a chance to reach its destination.

Figure 7:
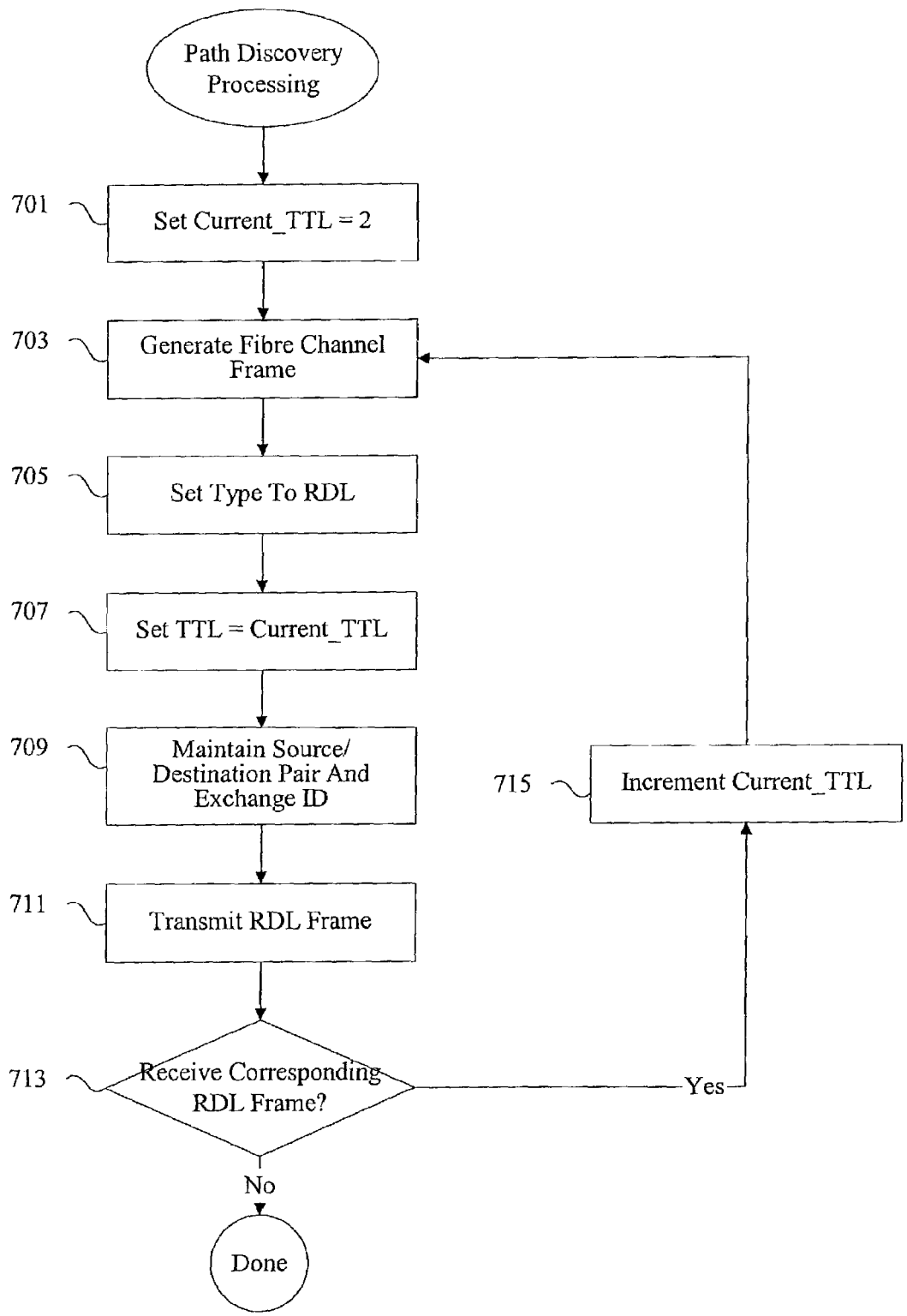
FIG. 7 is a flow process diagram showing operations for applying remote domain loopback for path discovery.

FIG. 7 is a process flow diagram showing one example of path discovery processing. According to various embodiments, the supervisor may wish to determine and how far along a path toward a destination a frame can be transmitted. One technique for determining a path is by setting the time-to-live field to specific values. At 701, a variable such as a current_TTL variable is set to two. Setting a current_TTL variable to two allows the frame to be transmitted to a next hop. As noted above, when a TTL variable is one, a fibre channel switch becomes a loopback fibre channel switch. A fibre channel frame is generated at 703. Loopback indicator is set at 705.

The time-to-live field is set to equal the variable current_TTL at 707. At 709, identifiers associated with the source, destination, and exchange are maintained. The loopback frame is transmitted at 711. It is determined at 713 whether the loopback frame corresponding to the maintained source, destination, and exchange identifiers is received at 713. According to various embodiments, the data included in received frames is analyzed. If a loopback frame corresponding to the maintained information is received at 713, the current time-to-live field is incremented at 715. The fibre channel frame is then generated at 703, the type of the fibre channel frame is set to loopback at 705, and the TTL is set to the new current_TTL which is now 3. The frame will now be transmitted an additional hop. By incrementing the TTL, the fibre channel frame is transmitted to more nodes in the network. A route from a source to a destination can also be gradually determined. If a loop back frame at 713 is not received, it is possible that a fibre channel switch in the route between the source and the destination fibre channel switch may be dropping frames. Using path discovery as described above can also be useful for determining round trip times even if switches in the fibre channel fabric are not synchronized.

As described above, providing time stamp information may be performed in a variety of network devices. According to various embodiments, the switch includes a processor, network interfaces, and memory. A variety of ports, Media Access Control (MAC) blocks, and buffers can also be provided as will be appreciated by one of skill in the art.

Figure 8:
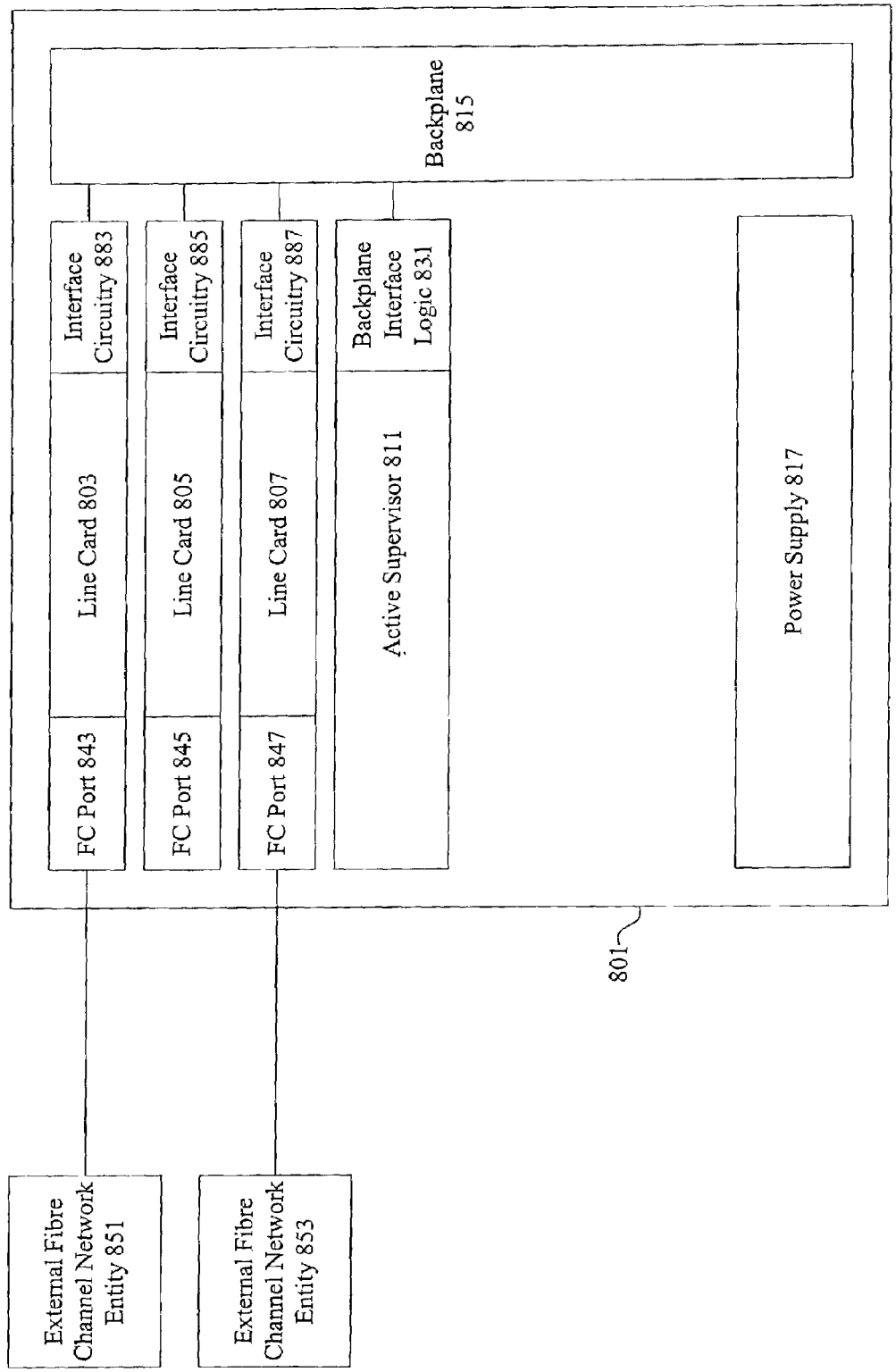
FIG. 8 is a diagrammatic representation of a fibre channel switch.

FIG. 8 is a diagrammatic representation of one example of a fibre channel switch that can be used to implement techniques of the present invention. Although one particular configuration will be described, it should be noted that a wide variety of switch and router configurations are available. The fibre channel switch 801 may include one or more supervisors 811. According to various embodiments, the supervisor 811 has its own processor, memory, and storage resources.

Line cards 803, 805, and 807 can communicate with an active supervisor 811 through interface circuitry 883, 885, and 887 and the backplane 815. According to various embodiments, each line card includes a plurality of ports that can act as either input ports or output ports for communication with external fibre channel network entities 851 and 853. The backplane 815 can provide a communications channel for all traffic between line cards and supervisors. Individual line cards 803 and 807 can also be coupled to external fibre channel network entities 851 and 853 through fibre channel ports 843 and 847.

External fibre channel network entities 851 and 853 can be nodes such as other fibre channel switches, disks, RAIDS, tape libraries, or servers. It should be noted that the switch can support any number of line cards and supervisors. In the embodiment shown, only a single supervisor is connected to the backplane 815 and the single supervisor communicates with many different line cards. The active supervisor 811 may be configured or designed to run a plurality of applications such as routing, domain manager, system manager, and utility applications.

According to one embodiment, the routing application is configured to provide message forwarding and routing functionality. A utility application can be configured to provide system clock and time stamp functionality. A domain manager application 325 can be used to assign domains in the fibre channel storage area network. Various supervisor applications may also be configured to provide functionality such as quality of service (QoS) functionality for various fibre channel protocol layers.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

What is claimed is:

1. A method for providing route characteristic information in a fibre channel fabric, the method comprising:
    providing a fibre channel frame at a source fibre channel switch, the fibre channel frame identifying the source fibre channel switch and a destination, wherein the fibre channel frame includes a loopback field indicating that the fibre channel frame should be looped back to the source fibre channel switch;
    transmitting the fibre channel frame downstream toward the destination;
    receiving the looped back fibre channel frame at the source fibre channel switch, the loopback fibre channel frame including time stamp information associated with a plurality of fibre channel switches between the source fibre channel switch and the destination, wherein the time stamp information provides information for determining characteristics associated with upstream and downstream transmission between the source fibre channel switch and the destination.

2. The method of claim 1, wherein the fibre channel frame is looped back at a loopback fibre channel switch.

3. The method of claim 2, wherein the loopback fibre channel switch is a fibre channel switch coupled to a host associated with the destination of the fibre channel frame.

4. The method of claim 1, wherein the source fibre channel switch and the plurality of fibre channel switches are synchronized.

5. The method of claim 1, wherein the looped back frame further includes time stamp information associated with the source fibre channel switch and the loopback fibre channel switch.

6. The method of claim 5, wherein the time stamp information allows determination of characteristics associated with upstream and downstream transmission between the source fibre channel switch, the plurality of fibre channel switches, and the loopback fibre channel switch.

7. The method of claim 5, wherein the fibre channel frame includes a time-to-live field.

8. The method of claim 1, wherein the fibre channel frame is looped back to the source fibre channel switch instead of being forwarded to a network entity that does not support loopback.

9. The method of claim 8, wherein the network entity is a host;

10. The method of claim 8, wherein the network entity is a switch that does not support fibre channel frames.

11. The method of claim 8, wherein the network entity is a fibre channel switch that does not support remote domain loopback.

12. The method of claim 1, wherein the fibre channel frame is looped back to the source fibre channel switch when the time-to-live field reaches a predetermined value.

13. A method for providing route characteristic information in a fibre channel fabric, the method comprising:
    receiving a fibre channel frame at a core fibre channel switch, wherein the fibre channel frame comprises a loopback field, a source identifier, and time stamp information, the time stamp information associated with a plurality of fibre channel switches the fibre channel frame passed through between the source and the core fibre channel switch; and
    determining whether to forward the fibre channel frame or to loop back the fibre channel frame.

14. The method of claim 13, wherein the fibre channel frame includes a time-to-live field.

15. The method of claim 14, further comprising decrementing the time-to-live field when the fibre channel frame is received at the core fibre channel switch.

16. The method of claim 13, wherein the frame is looped back if the time-to-live field reaches a predetermined value.

17. The method of claim 13, wherein the frame is looped back if the time-to-live field reaches the value of 1.

18. The method of claim 13, wherein the frame is looped back if the next hop for the fibre channel frame is determined to be a switch that does not support frames with a loopback field.

19. The method of claim 13, wherein the frame is looped back if the next hop for the fibre channel frame is a non fibre channel switch.

20. The method of claim 13, wherein the frame is looped back if the next hop for the fibre channel frame is a host.

21. An apparatus for providing route characteristic information in a fibre channel fabric, the apparatus comprising:
    means for providing a fibre channel frame at a source fibre channel switch, the fibre channel frame identifying the source fibre channel switch and a destination, wherein the fibre channel frame includes a loopback field indicating that the fibre channel frame should be looped back to the source fibre channel switch;

means for transmitting the fibre channel frame downstream toward the destination;

means for receiving the looped back fibre channel frame at the source fibre channel switch, the loopback fibre channel frame including time stamp information associated with a plurality of fibre channel switches between the source fibre channel switch and the destination, wherein the time stamp information provides information for determining characteristics associated with upstream and downstream transmission between the source fibre channel switch and the destination.

22. The apparatus of claim 21, wherein the fibre channel frame is looped back at a loophack fibre channel switch.

23. The apparatus of claim 22, wherein the loopback fibre channel switch is a fibre channel switch coupled to a host associated with the destination of the fibre channel frame.

24. The apparatus of claim 21, wherein the source fibre channel switch and the plurality of fibre channel switches are synchronized.

25. A fibre channel switch in a fibre channel fabric, the fibre channel switch comprising:

a processor operable to provide a fibre channel frame, the fibre channel frame identifying the source fibre channel switch and a destination, wherein the fibre channel frame includes a loopback field indicating that the fibre channel frame should be looped back to the source fibre channel switch;

an output interface coupled to the processor, the output interface configured to transmit the fibre channel frame downstream toward the destination; and an input interface coupled to the processor, the input interface configured to receive the looped back fibre channel frame at the source fibre channel switch, the loopback fibre channel frame including time stamp information associated with a plurality of fibre channel switches between the source fibre channel switch and the destination, wherein the time stamp information provides information for determining characteristics associated with upstream and downstream transmission between the source fibre channel switch and the destination.

26. The fibre channel switch of claim 25, wherein the fibre channel frame is looped back at a loopback fibre channel switch.

27. The fibre channel switch of claim 26, wherein the loopback fibre channel switch is a fibre channel switch coupled to a host associated with the destination of the fibre channel frame.

28. The fibre channel switch of claim 25, wherein the looped back frame further includes time stamp information associated with the source fibre channel switch and the loopback fibre channel switch.

29. The fibre channel switch of claim 28, wherein the time stamp information allows determination of characteristics associated with upstream and downstream transmission between the source fibre channel switch, the plurality of fibre channel switches, and the loopback fibre channel switch.

30. The fibre channel switch of claim 28, wherein the fibre channel frame includes a time-to-live field.

31. The fibre channel switch of claim 25, wherein the fibre channel frame is looped back to the source fibre channel switch instead of being forwarded to a network entity that does not support loophack.

* * * * *